UNITED STATES PATENT OFFICE.

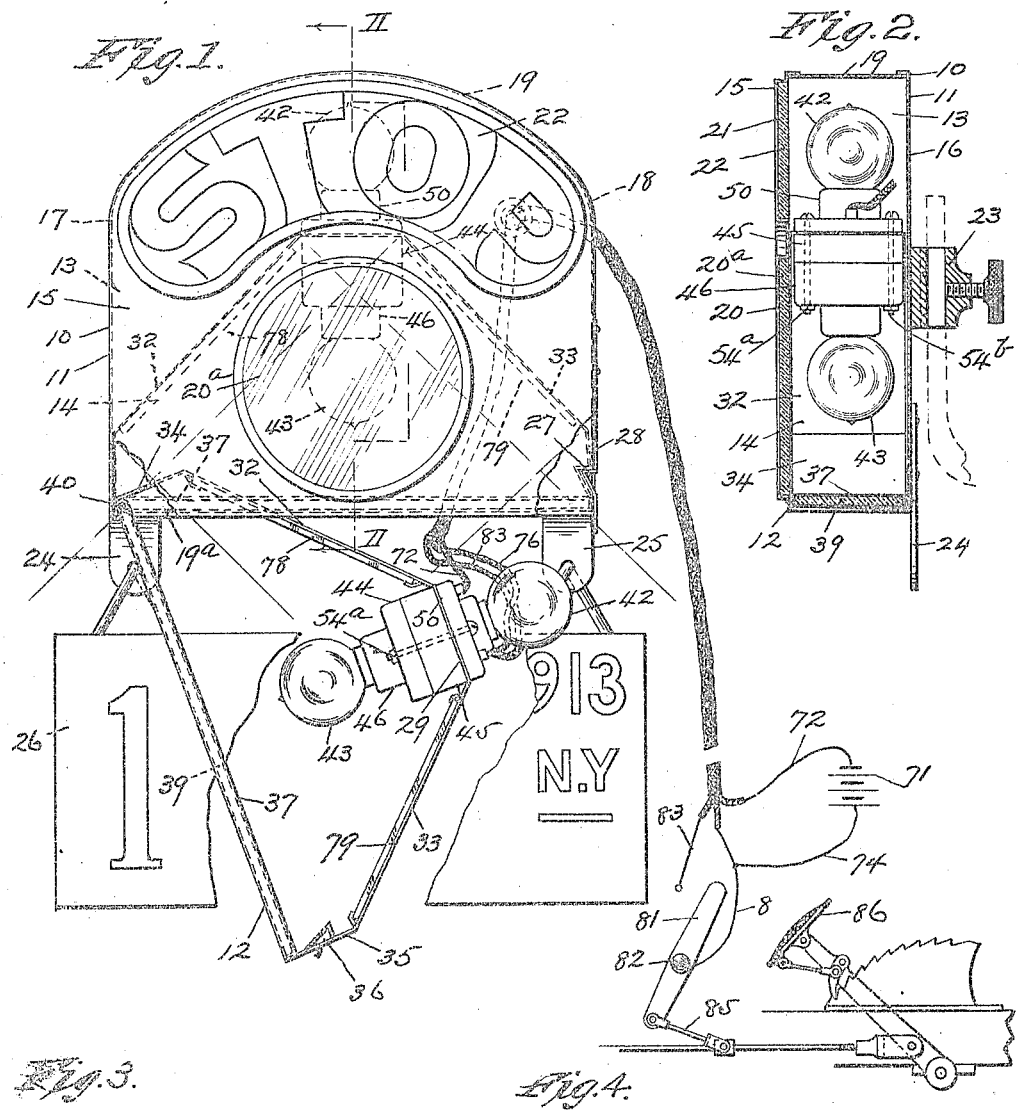

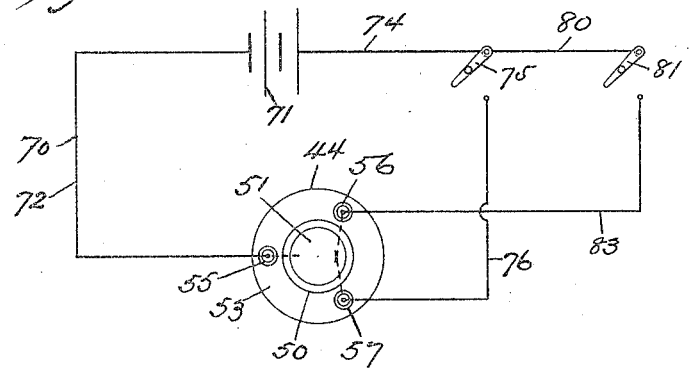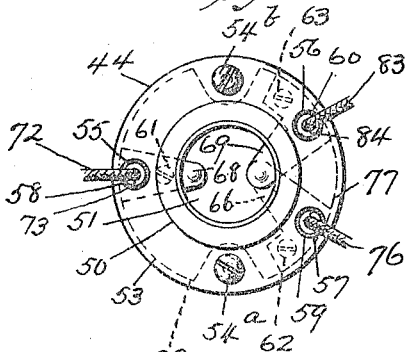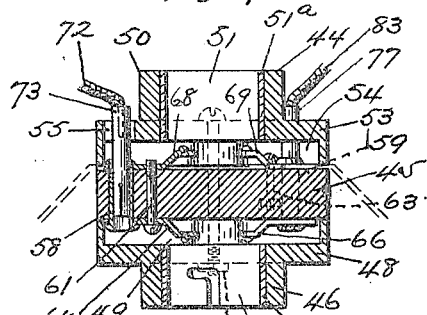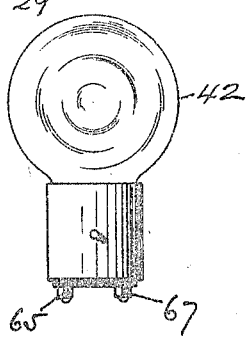

LAURENS P. DIXON, OF NEW YORK, N. Y.

VEHICLE-LAMP.

1,207,721.   Specification of Letters Patent.   Patented Dec. 12, 1916.

Application filed January 6, 1914. Serial No. 810,604.

*To all whom it may concern:*

Be it known that I, LAURENS P. DIXON, a citizen of the United States, and a resident of New York, county and State of New York, have invented a certain new and useful Improvement in Vehicle-Lamps, of which the following is a full, clear, and exact specification.

This invention relates more particularly to a class of lamps adapted to be used in conjunction with automobiles, or like vehicles.

My invention has for its object primarily to provide a lamp designed to be applied especially upon the rear end of an automobile, or other vehicle for permitting the customary red danger light to be exhibited at night as well as allowing the license number of the vehicle to be clearly shown, and which also enables a signal to be displayed whereby a warning may be given when the speed at which the vehicle may be traveling is checked, thereby obviating frequent accidents by overcoming all doubt at night as to whether the vehicle is traveling, or not. This is accomplished mainly by providing a casing composed of an outer hollow section having an open underside, and an inner hollow section which is hingedly connected to the outer section so as to be directed inwardly or outwardly of the outer section, and this inner section is formed of side walls so that when inserted in the outer section the walls thereof will serve as a removable partition for dividing the casing into upper and lower compartments. Mounted on the inner section are two electric lamps of any suitable types of electric bulbs, and these lamps are lighted by electricity leading from a battery carried in the vehicle. One of these lamps is adapted to be lighted at night for exhibiting the usual steadily burning red danger light and also the license number, while the second lamp is adapted to be intermittently lighted for showing as a signal the word "Stop".

Other objects of the invention are to provide means for removably mounting the lamps in superposed relation so that one is disposed in each chamber of the casing; to provide means for permitting the current to be supplied to the steadily burning electric lamp; to provide means whereby the electric circuit may be intermittently closed for lighting the "Stop" signal lamp by applying the brake which checks the vehicle; and to provide in the lower chamber reflectors adapted to refract the rays of light from the lamp therein directly upon the license number.

A practical embodiment of the invention is represented in the accompanying drawing forming a part of this specification in which similar characters of reference indicate corresponding parts in all the views, the said invention being more fully described hereinafter, and then pointed out in the claims at the end of the description.

In the drawing, Figure 1 is a front elevation, partly broken away, of one form of vehicle lamp embodying my invention. Fig. 2 is a section taken on the line II—II of Fig. 1. Fig. 3 is a perspective view of the transparent plate and its frame provided in the lower part of the frame of the second section of the lamp. Fig. 4 is a fragmentary top plan of the upper part of the frame of the section. Fig. 5 is a diagrammatic view of the electric circuit for supplying current to the lamps. Fig. 6 is a top plan of a form of socket employed for mounting the incandescent bulbs in the lamp. Fig. 7 is a longitudinal vertical section taken through the socket. Fig. 8 is an enlarged elevation of one of the incandescent bulbs used in the lamp, and Fig. 9 is an inverted plan of the incandescent bulb.

The lamp has a casing 10 constructed with two interfitting hollow sections 11 and 12 to provide an upper chamber 13 and a lower chamber 14 therein. The hollow section 11 has a front wall 15, a rear wall 16 which is spaced from the front wall, and the edges of these walls are connected by side walls 17, 18, and a top wall 19. The section 11 is thereby provided with an open underside 19$^a$. Through the lower part of the front wall 15 is a circular opening 20 in which is mounted a plate of glass, or other transparent material 20$^a$ of preferably a red color through which rays of light are projected for displaying the customary danger night signal, and through the upper part of the front wall is a curved elongated opening 21 in which may be mounted a plate of glass, or other transparent material, as 22, of white or a different color from the red transparent plate 20$^a$. The transparent plate 22 has the word "Stop" inscribed thereon, as shown, or instead of the opening and this glass plate the word "Stop" may be stamped out of the front wall so as to be clearly discernible to an observer. Approximately centrally of the exterior of the rear wall 16 of the section 11 is a clamp, as 23, which may be of any well-known form adapted to removably fasten the lamp to the back of a vehicle in accordance with the requirements for displaying lamps of this class. Projecting downwardly some distance from spaced parts of the lower edge of the rear wall 16 are two brackets 24 and 25 to which may be suspended a sign, or the usual plate, as 26, having the license number of the vehicle thereon. In the side wall 18 of the section 11 adjacent to its lower edge is an opening through which extends the head 27 of a well-known form of spring catch, as 28, provided on the lower part of this side wall.

The hollow section 12 is made of a size to adapt it to fit in the hollow section 13. The section 12 has a top plate 29 with a circular opening 29$^a$ therethrough, and projecting into the opening toward each other from opposite parts of the side edge portions of the top plate are two lugs 30 and 31 each having a hole therethrough. Diverging downwardly on similar inclines in opposite directions from the ends of the top plate are side walls 32 and 33 the lower end portions of which are bent to provide short vertically disposed portions, as 34 and 35, the latter wall being indented to provide a recess 36 for reception of the head 27 of the spring catch 28 to removably hold the section 12 in the section 11 when disposed therein. Soldered, or otherwise held in the lower ends of the vertical portions 34 and 35 of the side walls 32 and 33 is a frame 37 having upon its inner edges a continuous groove 38 in which is inserted a plate of glass, or other transparent material, as 39. Projecting in opposite directions from the side edges of the frame 37 at one end thereof are two pins 40 and 41 which are rotatably disposed through holes provided in the front wall and the rear wall of the section 11 adjacent to its corner which is opposite to the spring catch 28. The section 12 is thereby hingedly connected to the section 11 so as to be swung inwardly and outwardly through the open underside 19$^a$ thereof, and said section 12 is of a width and length to adapt it to be freely directed into the section 12, but to fit snugly therein so that the transparent plate 39 and its frame may close the lower end of the casing of the lamp. The section 12 is of considerably less height than the section 11, and by forming the top plate 29 and the side walls 32 and 33 of the section 12 in the manner described these parts of the section will serve as a removable partition to provide the upper chamber 13 while the hollow interior of the section 12 provides the lower chamber 14 when the sections are interfitted. These parts will then be held against accidental displacement by the head 27 of the catch 28 being sprung into the recess 36 of the section 12.

In the upper chamber 13 of the casing 10 is a lamp 42 of the form of an incandescent bulb adapted to be lighted by electricity, and in the lower chamber 14 of the casing is a second lamp 43 of a similar type to the lamp 42 and which is also adapted to be lighted by electricity. Serving as means for removably mounting the lamps 42 and 43 in superposed relation in the chambers of the casing, a socket, as 44, is provided. The socket 44 may be of any suitable form, but I prefer to employ the type of socket herein described, and which is not specifically claimed as part of this present invention. The socket 44 has a supporting member, or disk 45, and a lower member, or sleeve 46. The sleeve 46 is provided with an opening 47 midway therethrough, the wall of which is lined with copper, or other metal, as 47$^a$, which is a conductor of electricity and in this opening is inserted the neck of the electric lamp 43 for lighting the lower chamber of the casing. Projecting from the sleeve 46 is an annular L-shaped flange 48 which abuts against the underside of the disk 45 so that the sleeve proper is spaced from the disk to provide a lower chamber 49 communicating with the opening 47. On top of the disk 45 is an upper member, or sleeve 50 having an opening 51 through its center.
The wall of the opening 51 is also lined with copper, or other metal, as 51$^a$, which is a conductor of electricity, and in this opening is seated the electric lamp 42 for lighting the upper chamber of the casing 10. The sleeve 50 has an annular inverted L-shaped flange 53 the lower edge of which is disposed in close proximity to the top surface of the disk 45 whereby the sleeve will be spaced from the disk to provide an upper chamber 54 which communicates with the opening 51. The disk 45, and the sleeves 46 and 50 are made of porcelain, or other non-conductive material, and these parts are secured together as well as being held to the top plate 29 of the section 12 by providing through the disk, and through each of the sleeves two registered openings. When the socket 44 is applied to the lamp the sleeve 50 is disposed on the upper surface of the top plate 29 of the side walls of the section 12, and the disk 45 with the sleeve 46 is disposed under this top plate. These parts are then arranged so that the registered openings thereof are in register with the holes of the lugs 30 and 31 of the top plate 29, and by the use of bolts 54$^a$ and 54$^b$ passed through the registered openings and through the holes of the top plate the socket will be removably held to the section 12 of the lamp.
Through the annular flange 53 of the sleeve 50 are three spaced openings 55, 56, 57 all of which lead into the upper chamber 54 of the socket. Through corresponding parts of the disk 45 are three passages in which are inserted metal tubes 58, 59, 60 of lengths somewhat longer than the passages of the disk, and the passage of each of these metal tubes is in register with one of the spaced openings of the sleeve 50. Also through the disk 45 are three openings in which are inserted bolts 61, 62, 63, and these bolts are longer than the width of the disk. Connected to the lower end of the bolt 61 and to the lower end of the metal tube 58 is a contact 64 which is arranged in the lower chamber 49 of the socket so as to be engaged by one of the contacts 65 of the lower electric lamp. Also disposed in the lower chamber 49, and to the bolt 62 as well as to the metal tube 59 is connected an end portion of a contact 66, and this contact is arranged so that the other end thereof will be engaged by the second contact 67 of the electric lamp. Connected to the upper end of the bolt 61 and to the upper end of the metal tube 58 is a contact 68 disposed in the upper chamber 54 of the socket for engagement by one of the contacts of the second electric lamp. To the upper end of the bolt 62 and to the upper end of the metal tube 59 is connected one end of a contact 69 arranged in the upper chamber so that its other end will be engaged by the second contact of said electric lamp.

In order to supply current for lighting the lamps 42 and 43, in the vehicle is provided an electric circuit, as 70, leading from a battery 71 which may be of any desired make. To one pole of the battery 71 is connected one end of a wire 72 having a split plug 73 on its other end, and this plug is adapted to be removably inserted through the opening 55 of the sleeve 50 and also adapted to be removably inserted into the metal tube 58 of the socket for permitting the wire to be detachably contacted with the contacts 64 and 68 of the socket. From the second pole of the battery 71 is a wire 74 leading to a switch 75 of any ordinary form which when moved accordingly will engage the contact on one end of a wire 76. On the other end of the wire 76 is a split plug, as 77, which is adapted to be removably inserted through the opening 56 of the sleeve 50 and also adapted to be removably inserted in the metal tube 59 of the socket. To light the lamp in the lower chamber of the casing 10 the switch 75 is moved into engagement with the contact of the wire 76. By directing the plugs 73 and 77 into the metal tubes 58 and 59, respectively, the circuit will be closed from the battery over the wire 72, through the plug 73, through the metal tube 58 and contact 64, through the lamp 43, through the contact 66 and metal tube 59, through the split plug 77, over the wire 76, through the switch 75, and over the wire 74 to the battery. The red danger signal in the lower part of the lamp will thereby be displayed.

Serving as means for also employing the light from the lamp 43 for prominently displaying the license number of the vehicle on the plate 26 especially at night, in the section 12 of the casing 10 and over the lamp 42 are two reflectors 78 and 79 which are disposed in downwardly diverging directions. One of the reflectors 78 and 79 is held to the underside of each of the diverging side walls 32 and 33 of the section 12 of the casing 10 so that the rays of the light from the lamp 43 will be refracted in crosswise directions through the transparent plate 39 in the lower end of the section 12. The license number of the vehicle may then be plainly seen in entirety at night. The reflectors 78 and 79 are preferably in the forms of glass mirrors, or by silver-plating, or nickel-plating the inner surfaces of the walls of the section 10 suitable reflectors may be provided to permit the glass mirrors to be dispensed with.

For the purpose of permitting the lamp 42 in the upper chamber of the casing 10 to be intermittently lighted whereby the "Stop" signal will be displayed when the speed of the vehicle is checked while traveling, to the switch 75 is connected one end of a wire 80 having its other end connected to a switch 81 which may be in the form of a bar of metal, or may be of any suitable form. The central part of the switch 81 is pivoted, at 82, to a suitable part of the vehicle for one of its ends to be adapted to engage the contact on one end of a wire 83. On the other end of the wire 83 is a split-plug 84 adapted to be removably guided through the opening 57 of the sleeve 50 of the socket, and this plug is also adapted to be removably directed into the metal tube 60 of the socket. The other end of the switch 81 is pivotally connected to one end of a link, as 85, having its other end pivoted to the operating rod of the brake mechanism, as 86, of the vehicle. To provide for lighting the lamp 42 for intermittently displaying the "Stop" signal, the plug 84 is inserted in the metal tube 60 of the socket after being passed through the opening 57 of the sleeve 50. When the brake mechanism 86 is applied to check the speed of the vehicle the link 85 will be moved to swing the switch 81 into engagement with the contact of the wire 83. The circuit will thereby be closed from the battery over the wire 74, through the switch 75, over the wire 80, through the switch 81, over the wire 88, through the plug 84 and the metal tube 60, through contact 69 in the upper chamber of the socket, through the lamp 42, through the contact 68, through the plug 73, and over the wire 72 to the battery. When the brake mechanism is released the link 85 and the switch 81 will be reversely moved, and this circuit will be opened for cutting-off the "Stop" signal. Frequent accidents will thereby be obviated by thus overcoming all doubt as to whether the vehicle is traveling or not. Obviously by constructing the section 12 so as to be adapted to be guided inwardly and outwardly of the open underside of the section 11 of the casing the inner parts of the lamp will thereby be protected more effectually from damage during inclement weather than the forms of this class of lamps which are made with doors. Moreover, when the section 12 is swung outwardly of the section 11 the electric lamps may be readily replaced with others in event of being damaged. The wires leading to the lamps may also be conveniently disconnected from the socket of the lamps, and should the glass plate of the section 12 be broken it may be easily replenished.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope of the appended claims.

Having thus described my invention, I claim as new and desire to secure by Letters Patent:—

1. In a vehicle lamp, a casing having an outer hollow section formed with an open underside, an inner hollow section movably interfitting the outer section, and having side walls formed to serve as a movable partition to provide the casing with upper and lower compartments, said inner section also having an open end communicating with the open underside of the outer casing, a transparent plate in the open end of the inner section, means on the outer section for carrying a sign below the open underside of the casing, a socket provided on the wall of the inner section, two electric lamps mounted in the socket, one disposed in the upper compartment and one disposed in the lower compartment, an electric circuit, and means for removably connecting the electric circuit to the lamps, reflectors within the inner section, and arranged to reflect the light from the lower lamp through the transparent plate of the inner section, and said inner section being hingedly connected to the outer section so as to be swung inwardly and outwardly of the outer section whereby the electric lamp may be replaced when damaged as well as permitting the electric circuit to be disconnected from the socket.

2. In a vehicle lamp, a casing having an outer hollow section formed with an open underside, an inner hollow section movably interfitting the outer section, and having side walls formed to divide the casing into separable upper and lower compartments, a transparent plate in the outer section for permitting a light to serve as a danger signal to be displayed therethrough from the lower compartment, means also provided in the outer section to permit a light from the upper compartment to be displayed to serve as a "Stop" signal, a socket on the wall of the inner section, two electric lamps mounted in the socket, one disposed in the upper compartment and one disposed in the lower compartment, and an electric circuit adapted to be closed when the brake mechanism is applied to check the speed of the vehicle whereby the lamp in the upper compartment may be lighted, and adapted to be opened to extinguish the light when the brake mechanism is released, and said inner section being hingedly connected to the outer section so as to be swung inwardly and outwardly of the outer section whereby the electric lamps may be replaced when damaged as well as permitting the electric circuit to be disconnected from the socket.

3. In a vehicle lamp, a casing having an outer hollow section formed with an open underside, an inner hollow section removably interfitting the outer section, and having side walls formed to divide the casing into separable upper and lower compartments, said inner section also having an open end communicating with the open underside of the outer casing, means on the outer section for carrying a sign below the open underside of the casing, a transparent plate in the outer section for permitting a light to serve as a danger signal to be displayed therethrough from the lower compartment, means also provided in the outer section to permit a light from the upper compartment to be displayed to serve as a "Stop" signal, a socket on the wall of the inner section, two electric lamps mounted in the socket, one disposed in the upper compartment and one in the lower compartment, means on the socket to permit an electric circuit to be removably connected to the lamps whereby the lamp in the upper compartment may be lighted when the brake mechanism is applied to stop the vehicle, and the light may be extinguished when the brake mechanism is released.

This specification signed and witnessed this fifth day of January A. D. 1914.

LAURENS P. DIXON.

Witnesses:
 ROBT. B. ABBOTT,
 M. DERMODY.